United States Patent
Kurtlucan et al.

(10) Patent No.: US 9,715,955 B2
(45) Date of Patent: Jul. 25, 2017

(54) CABLE BUSHING FOR A POTENTIALLY EXPLOSIVE AREA

(71) Applicant: Honeywell International Inc., Morristown, NJ (US)

(72) Inventors: Bilal Kurtlucan, Wettenberg (DE); Michael Kroh, Butzbach Hoch-Weisel (DE); Andreas Weber, Hüttenberg (DE); Andreas Weigand, Bischoffen (DE); Waldemar Doerk, Langgöns (DE); Ralf Both, Reichelsheim (DE); Markus Hantzsch, Rheinland Pfalz (DE); Rolf Schmitt, Lambsheim (DE); Michael Teufel, Kraichtal (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/890,789

(22) PCT Filed: Sep. 26, 2014

(86) PCT No.: PCT/EP2014/070696
§ 371 (c)(1),
(2) Date: Nov. 12, 2015

(87) PCT Pub. No.: WO2015/044387
PCT Pub. Date: Apr. 2, 2015

(65) Prior Publication Data
US 2016/0365180 A1    Dec. 15, 2016

(30) Foreign Application Priority Data

Sep. 26, 2013   (DE) .................. 10 2013 015 999

(51) Int. Cl.
H02G 3/18    (2006.01)
H01B 17/30   (2006.01)
(Continued)

(52) U.S. Cl.
CPC ............... *H01B 17/30* (2013.01); *H02G 3/22* (2013.01); *H02G 3/088* (2013.01)

(58) Field of Classification Search
CPC .......... H01B 17/30; H02G 3/088; H02G 3/22
(Continued)

(56) References Cited

U.S. PATENT DOCUMENTS 5,091,605 A  *  2/1992  Clifford ............... H02G 3/22
                                                   174/151
5,381,321 A      1/1995  Fearing, Jr. et al.
(Continued)

FOREIGN PATENT DOCUMENTS

DE        10138124 A1      2/2003
DE    202009009048 U1     12/2010
(Continued)

*Primary Examiner* — Sherman Ng
(74) *Attorney, Agent, or Firm* — Jetter & Associates, P.A.

(57) ABSTRACT

A cable bushing includes a metal tube, at least one cable for signal transmission received from a sensor which extends in an opposite direction inside the metal tube, which, in at least one axial end region sits with an immovable fit in a through-hole of a bearing block. The bearing block is arranged in a sealed manner in a passage of a housing wall or is connected in a sealed manner to the sensor.

14 Claims, 4 Drawing Sheets

(51) Int. Cl.
   *H02G 3/22* (2006.01)
   *H02G 3/08* (2006.01)
(58) Field of Classification Search
   USPC .......................................................... 174/650
   See application file for complete search history.

(56) References Cited

U.S. PATENT DOCUMENTS

| | | | |
|---|---|---|---|
| RE35,820 E | 6/1998 | Guginsky | |
| 5,928,032 A | 7/1999 | Dreesen | |
| 6,150,607 A | 11/2000 | Weyl et al. | |
| 6,613,206 B1 * | 9/2003 | Weyl | G01N 27/407 |
| | | | 204/421 |
| 6,893,273 B2 * | 5/2005 | Sato | H01R 9/0527 |
| | | | 174/360 |

FOREIGN PATENT DOCUMENTS

| | | |
|---|---|---|
| DE | 102009060564 A1 | 6/2011 |
| DE | 202011101497 U1 | 2/2012 |
| DE | 102013105476 A1 | 12/2013 |
| WO | 2012016602 A2 | 2/2012 |

* cited by examiner

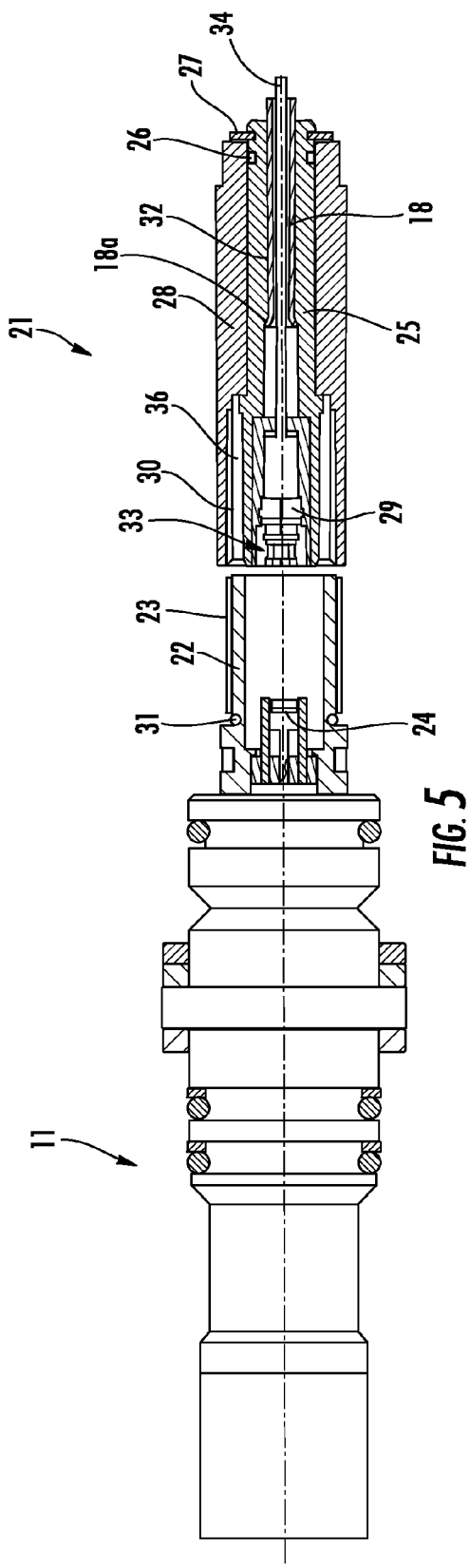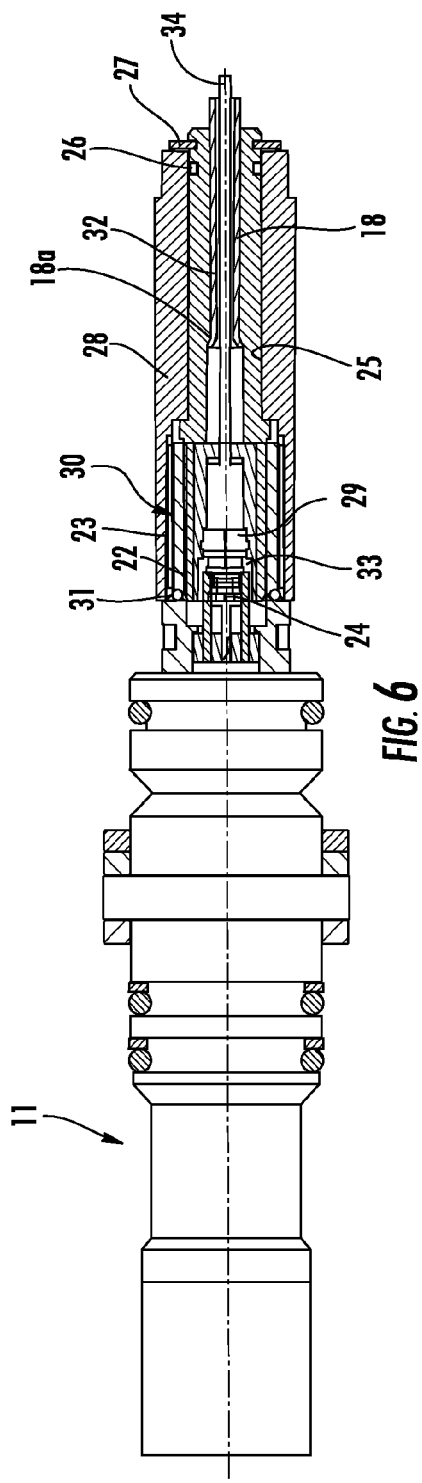

CABLE BUSHING FOR A POTENTIALLY EXPLOSIVE AREA

CROSS REFERENCE TO RELATED APPLICATIONS

This national stage application claims the benefit of PCT Application Serial No. PCT/EP2014/070696 entitled "Cable bushing for a potentially explosive area", filed 26 Sep. 2014, which claims priority to German Application Serial No. DE 10 2013 015 999.7 entitled "Cable bushing for a potentially explosive area" filed 26 Sep. 2013, which are both herein incorporated by reference in their entireties.

FIELD

Disclosed embodiments relate to cable bushings having structures for explosion protection.

BACKGROUND

In electrics, a bushing is an electrically insulated device that allows an electrical conductor to pass safely through a typically earthed conducting barrier. Cable bushings may be used in a potentially explosive area, such as for example when connecting sensors for the detection of flow in a gas line and its assigned electronic apparatus, wherein the electronic apparatus generally sits in an external housing. The electronic apparatus is typically connected to each of the sensors by a cable. For reasons of safety, the cable is mechanically protected against external mechanical influences and the electronic apparatus also needs to withstand a predetermined internal pressure in the case of an explosion.

To meet the desired requirements, it is known to accommodate the electronic apparatus in a relatively stable housing and also to lay the cables in a special housing. However, this procedure is very cumbersome and cost-intensive.

It is known to provide the cable with a metal fabric in order to protect it from external mechanical influences. However, such cable arrangements are relatively thick and difficult to handle and, in particular, so that the end connection of the cable to the assigned sensor or to the introduction into the housing is generally both complicated and expensive.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include cable bushings for connecting sensors to an electronic evaluation apparatus within a housing adapted for use in a potentially explosive areas having a relatively simple construction. At least one cable extends into a hollow metal tube which, in at least one axial end region, sits with a narrow fit immovably and tightly in a through-hole of a bearing block. The bearing block is arranged in a sealed manner in a passage of a housing wall or connected in a sealed manner to a sensor. As used herein, the term "metal" includes metals as well metal alloys such as steel.

The two axial ends of the metal tube, which can be made of steel (e.g., stainless steel) or aluminium can be each connected to a bearing block in that it is introduced with a narrow fit into a through-hole of the bearing block and axial fixed there. The fixation of the metal tube can, for example, be provided by an interference fit or as the result of thermal shrinkage, which ensures that the entire surface of the metal tube lies on the wall of the through-hole.

Alternatively or additionally, to this end it can be provided to this end that the metal tube is soldered and in particular hard-soldered to the bearing block. Soldering can ensure that a possible minimal gap remaining between the outer surface of the metal tube and the internal wall of the through-hole is completely sealed. The seal can achieve high tightness protection (IP protection) up to class IP68. In addition, the soldered connections also ensure an electrical connection between the metal tube and the bearing block, which enables electrical voltages to be transmitted and diverted reliably.

Alternatively or additionally to the soldering, it can be provided that the metal tube is welded to the bearing block or in glued over its entire circumference in the through-hole by an adhesive, wherein the adhesive can be an electrically conductive adhesive. The metal tube can also be axially fixed in the through-hole by a radial expansion, i.e. in a positive manner.

In some embodiments it is provided that due to its material and/or its dimensions, the metal tube is soft and deformable enough to be bent manually by user. This ensures that the metal tube can be adapted to the structural conditions at the installation site in a simple way. The diameter of the metal tube can lie within in the range of from 2 mm to 5 mm and the wall thickness of the metal tube in the range of 0.3 mm to 0.8 mm.

In order to introduce the cable extending in the metal tube in a housing, for example an electronic apparatus, a passage can be provided in the housing wall, in which the bearing block connected to the axial end region of the metal tube is arranged in a sealed manner and in particular screwed. In its mounted position, the bearing block can in particular be fixed by a lock nut.

A plurality of sensors can each be connected by a cable to a common electronic apparatus. Each cable can extend in its own metal tube, wherein, however, in the bearing block, a plurality of through-holes can in one particular embodied be in parallel to one another, in each of which a metal tube is inserted and fixed in the way described. However, it is alternatively also possible to arrange the holes in the bearing block radially or in a star shape and allow them to open into an interior area of the bearing block.

On the side of the cable facing the sensor, a recess can be embodied in the bearing block in which a plug attached to the cable is arranged. The bearing block is placed on the sensor, wherein the plug engages with a counterplug embodied on the sensor. To ensure a reliable connection between the plugs, it can be provided in a development of the invention that the plug is fixed, and in particular glued, on the bearing block.

To hold the bearing block securely on the sensor, it can be provided that the bearing block is screwed to a connecting piece of the sensor by a sleeve-shaped union nut. This can achieve a pressure-tight connection if at least one seal is arranged between the bearing block and the union nut. A further seal can be provided between the union nut and the sensor.

A union nut can sit rotatably on the bearing block and be axially fixed relative thereto by a securing element. This embodiment has the further advantage that no torsional forces are exerted on the metal tube or the cable extending thereupon on the rotation of the union nut.

BRIEF DESCRIPTION OF THE DRAWINGS

FIG. 5 shows the connection of the cable on a sensor in dismantled position, and FIG. 6 shows the connection of the cable on a sensor in dismantled position in FIG. 5 in an assembled position.

DETAILED DESCRIPTION

Figure 1:
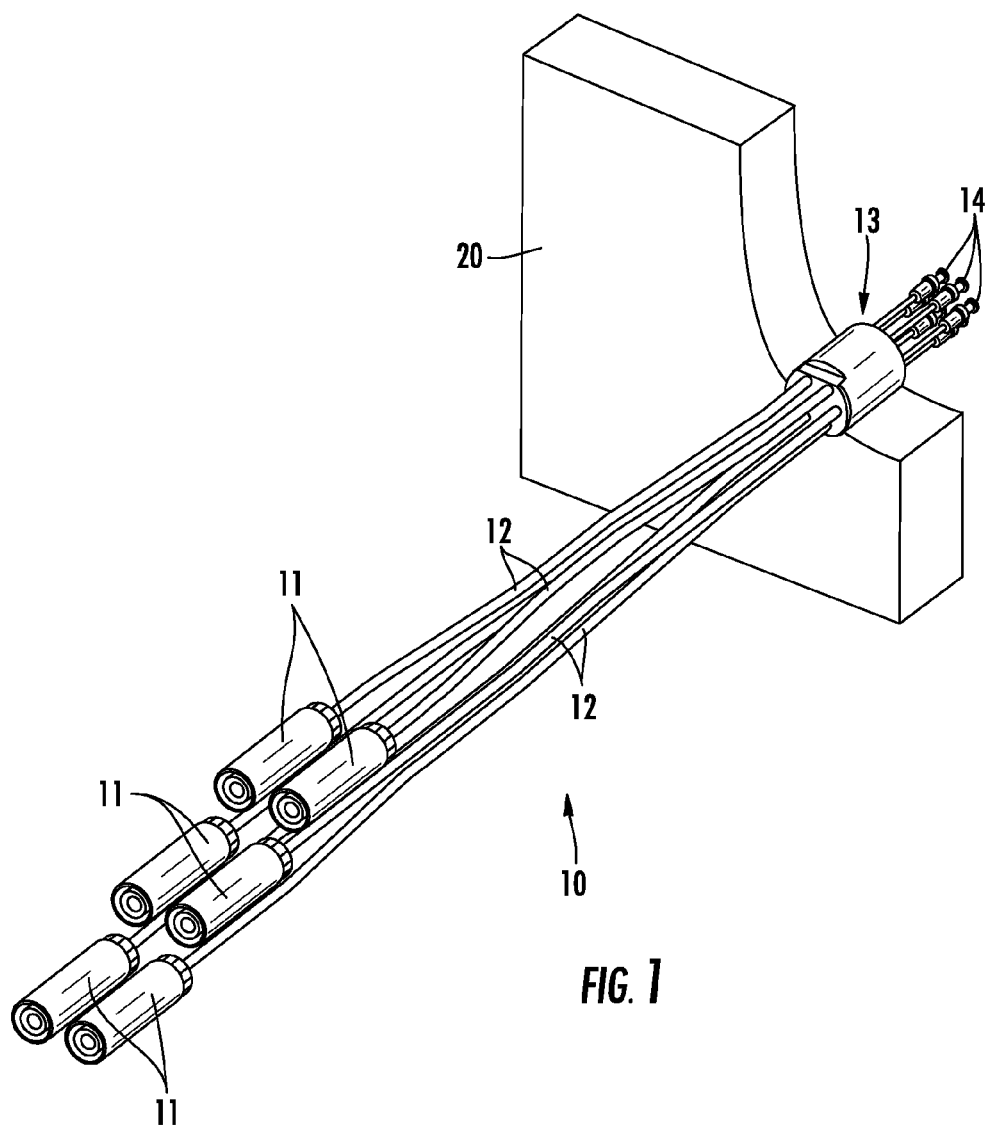
FIG. 1 shows an example cable bushing connecting sensors to an electronic evaluation apparatus within a housing with a housing wall shown, all in a perspective view.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a perspective view of a cable bushing 10 providing a connection from six sensors 11 shown each of which is connected by a line 12 to an electronic evaluation apparatus or the like (not shown) within a housing wall 20 shown in FIG. 1. At their ends facing away from the sensors 11, the lines 12 each have a plug 14 and can be guided via a common cable entry 13 through the housing wall 20 indicated in FIG. 1 into the interior of a housing, where it is connected by the plug 14 to the electronic evaluation apparatus within the housing. The lines 12 extending between the sensors 11 and the cable entry 13 comprise a metal tube 18 (see FIG. 2), which can comprise steel such as stainless steel and can have an area dimension small enough so that the metal tube 18 can be bent manually. For example, the metal tube 18 can be hollow, a diameter of the metal tube 18 can lie within the range of from 2 mm to 5 mm and the wall thickness can lie within the range of from 0.3 mm to 0.8 mm. A single cable 34 (see cable 34 in FIG. 2) for signal transmission from the sensor 11 extends inside the metal tube 18. However, it is also possible for a plurality of, for example twisted cables to extend together inside the metal tube 18.

Figure 2:
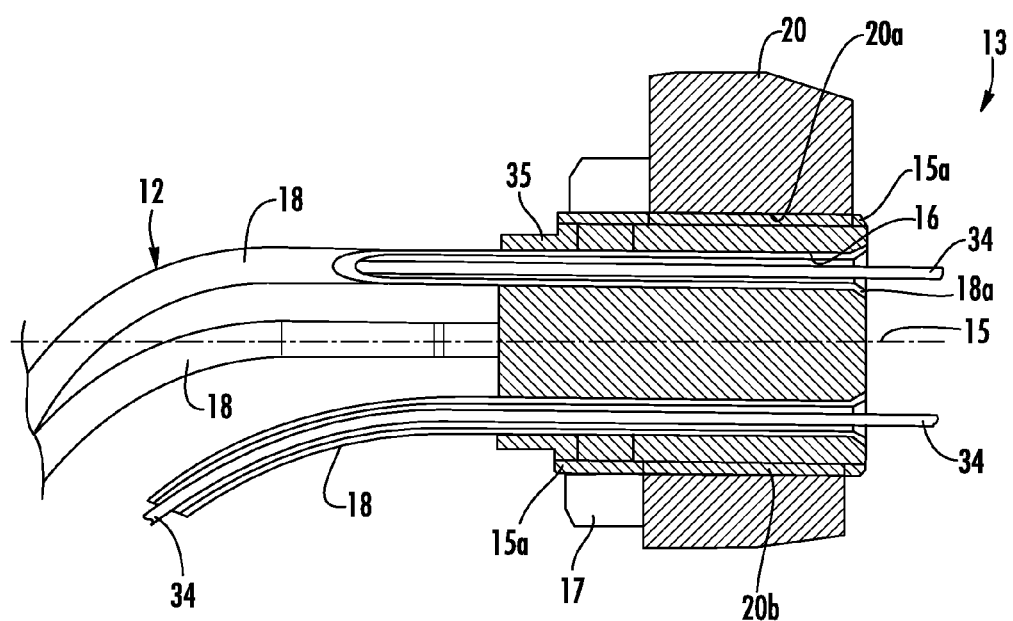
FIG. 2 is a vertical section through the cable entry in a housing.

FIG. 2 is an enlarged sectional view of the cable entry 13. The cable entry 13 comprises a metal bearing block (bearing block) 15 with an external thread 15a with which the bearing block 15 can be screwed into a passage 20a in the housing wall 20, wherein the passage 20a has a thread 20b which engages with the external thread 15a of the bearing block 15. This thread engagement is designed with respect to the thread grooves, the thread pitch and the dimensions of the components such that a connection compliant with the requirements for potentially explosive areas is provided. The bearing block 15 with its external thread 15a protrudes on the outer side the housing wall 20 and a lock nut 17 is screwed onto the bearing block 15 and fixes the bearing block 15 in its mounted position.

A plurality of parallel through-holes 16 extending to one another and distributed over the circumference of the bearing block 15 are arranged in the bearing block 15, wherein the number of through-holes 16 corresponds to the number of lines 12 to be passed through. The axial end region of one of the metal tubes 18 is inserted with a narrow fit and fixed in each through-hole 16 in the bearing block 15. The fixation of the metal tube 18 in the through-hole 16 can be achieved by a press fit or thermal shrinkage so that the metal tube 18 sits in the through-hole 16 and is held therein under radial prestress. Additionally, it can be provided that the metal tube 18 can be glued to the internal wall of the through-hole 16 by an adhesive 35 generally applied to the entire circumference, which can be electrically conductive.

Figure 3:
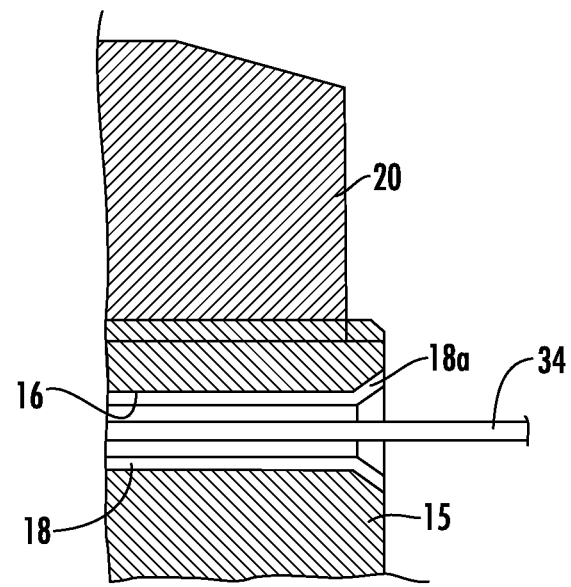
FIG. 3 shows the possibility for the axial fixation of the metal tube.

As shown in FIG. 3, an opening cross section of the through-hole 16 expands in a funnel shape on the inner side of the housing wall 20 and the axial end of the metal tube 18 that is aligned such that it approximately lies in a plane with the opening cross section of the through-hole 16. Here, the opening cross section of the metal tube 18 has a radial expansion 18a so that the metal tube 18 is axially secured positively in the funnel-shaped through-hole 16.

Figure 4:
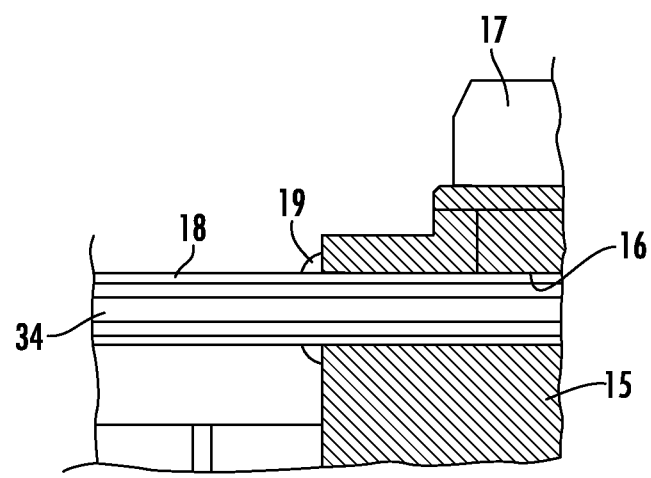
FIG. 4 shows a further possibility for the axial fixation of the metal tube.

FIG. 4 shows an embodiment with which the metal tube 18 on the outer side of the bearing block is connected to the bearing block 15 by the application of solder 19. The solder 19 can penetrate the interspace between the outer circumference of the metal tube 18 and the opening cross section of the through-hole 16 and seal it. The solder 19 is also used to secure the metal tube 18 axially relative to the bearing block 15 and in addition ensures that the metal tube 18 and the bearing block 15 are connected to one another in an electrically conductive manner in order to divert any voltages that occur.

As FIG. 1 shows, the metal tube 18 in each line 12 extends continuously from the cable entry 13 to the associated sensor 11 to which it is connected by a cable connection 21 in an example way shown in FIGS. 5 and 6. On the end of the metal tube 18 facing the sensor 11, a metal bearing block 25 is provided which has a through-hole 32 in which the assigned axial end of the metal tube 18 is inserted in the way described with a narrow fit immovably and tightly. The cable 34 protrudes out of the metal tube 18 on the side of the metal tube 18 facing the sensor 11 and extends into in a chamber-like recess 33 of the bearing block 25, in which a plug 29 connected to the cable 34 is arranged. The plug 29 is fixed in the recess 33 for example by an adhesive.

On the outer side, the bearing block 25 is surrounded by a sleeve-like union nut 28 mounted rotatably on the bearing block 25. The union nut 28 is prevented from undergoing axial displacement relative to the bearing block 25 by a securing element 27. Between the outer surface of the bearing block 25 and the inner surface of the union nut 28, a sealing ring 26 is arranged on the rear end facing away from the sensor 11.

The region of the bearing block 25 accommodating the plug 29 is surrounded at a distance by the union nut 28 with the formation of an annular gap 36. In this region, the union nut 28 has an internal thread 30. The sensor 11 comprises at its posterior end a connecting piece 22 with a plug 24 in its interior and bearing an external thread 23 on its outer surface. In addition, a sealing ring 31 is arranged on the outer side of the connecting piece 22.

If the bearing block 25 with the union nut 28 from the position shown in FIG. 5 is inserted on the connecting piece 22 of the sensor 11, the region the bearing block 25 accommodating the plug 29 enters the interior of the connecting piece 22. The connecting piece 22 engages in the annular gap 36 between the bearing block 25 and the union nut 28 and on rotation of the union nut 28, its internal thread 30 engages with the external thread 23 of the connecting piece 22 thus causing the union nut 28 and hence the bearing block 25 to be displaced axially relative to the sensor 11 until the plug 29 of the bearing block 25 engages with the plug 24 of the sensor 11. In this state shown in FIG. 6, the sealing ring 31 provides a seal between the connecting piece 22 and the union nut 28. In mounted state, the screw fitting can, for example, be fixed by a suitable securing element.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A cable bushing, comprising:
a metal tube;
at least one cable for signal transmission received from a sensor which extends in an opposite direction inside the metal tube, which, in at least one axial end region, sits with an immovable fit in a through-hole of a bearing block,
wherein the bearing block is arranged in a sealed manner in a passage of a housing wall or is connected in a sealed manner to the sensor, and
wherein the bearing block has threads and is screwed into a thread in the passage of the housing wall.

2. The cable bushing according to claim 1, wherein the metal tube sits in the through-hole with a press fit.

3. The cable bushing according to claim 1, wherein the metal tube comprises a steel or aluminium.

4. The cable bushing according to claim 1, wherein the metal tube is soldered or welded to the bearing block.

5. The cable bushing according to claim 1, wherein the metal tube is glued in the through-hole by an electrically conductive adhesive.

6. The cable bushing according to claim 1, wherein the metal tube is axially fixed in the through-hole by a radial expansion.

7. The cable bushing according to claim 1, wherein the metal tube is sufficiently small in dimension to be bent manually.

8. The cable bushing according to claim 1, wherein the through-hole comprises a plurality of through-holes and the metal tube comprises a plurality of metal tubes.

9. The cable bushing according to claim 1, wherein a recess is in the bearing block in which a plug attached to the cable is arranged.

10. The cable bushing according to claim 9, wherein the plug is fixed on the bearing block.

11. The cable bushing according to claim 1, wherein the bearing block is screwed to a connecting piece of the sensor by a union nut.

12. The cable bushing according to claim 1, wherein the metal tube sits in the through-hole with an interference fit.

13. The cable bushing according to claim 11, wherein at least one seal is arranged between the bearing block and the union nut.

14. The cable bushing according to claim 13, wherein the union nut sits rotatably on the bearing block and is axially fixed relative thereto by a securing element.

* * * * *